United States Patent
Okrongli

(10) Patent No.: US 7,500,231 B2
(45) Date of Patent: Mar. 3, 2009

(54) METHOD, SOFTWARE PRODUCT AND SYSTEM FOR CARRYING OUT UNIVERSAL, COMPUTER-AIDED INFORMATION PROCESSING

(76) Inventor: Oliver Okrongli, Haeherweg 35, Hamburg (DE) 22399

( * ) Notice: Subject to any disclaimer, the term of this patent is extended or adjusted under 35 U.S.C. 154(b) by 306 days.

(21) Appl. No.: 10/506,500

(22) PCT Filed: Feb. 21, 2003

(86) PCT No.: PCT/EP03/50030

§ 371 (c)(1),
(2), (4) Date: Sep. 3, 2004

(87) PCT Pub. No.: WO03/075157

PCT Pub. Date: Sep. 12, 2003

(65) Prior Publication Data

US 2005/0149906 A1    Jul. 7, 2005

(30) Foreign Application Priority Data

Mar. 7, 2002  (DE) ............................. 102 11 436
May 17, 2002  (EP) ............................. 02400029

(51) Int. Cl.
*G06F 9/44* (2006.01)
*G06F 9/45* (2006.01)

(52) U.S. Cl. .................. 717/144; 717/146; 717/105; 717/106; 717/107; 717/108; 717/109; 717/110

(58) Field of Classification Search ................ None
See application file for complete search history.

(56) References Cited

U.S. PATENT DOCUMENTS

| | | | | |
|---|---|---|---|---|
| 5,790,863 A | * | 8/1998 | Simonyi | 717/113 |
| 5,838,980 A | * | 11/1998 | Guillen et al. | 717/143 |
| 5,987,246 A | * | 11/1999 | Thomsen et al. | 717/109 |
| 6,314,562 B1 | * | 11/2001 | Biggerstaff | 717/156 |
| 6,671,869 B2 | * | 12/2003 | Davidson et al. | 716/17 |

* cited by examiner

*Primary Examiner*—Chuck Kendall

(57) ABSTRACT

Disclosed are a method, a software product and a system for machine-executable information processing, representing information in a hierarchical data structure consisting of at least two hierarchy levels, where the structural configuration can be modeled by input means and the contents of an element can either:

a) be manipulated by input means; or
b) be determined by machine-evaluating an expression, which can be manipulated by input means, said expression being able to contain a reference to at least one other element.

Preferred embodiments involve separate modeling in an object hierarchy and a class hierarchy, manipulatable parameters for activating different representation modes and operation modes, and involve distributed parallel processing in conjunction with user-controlled and/or machine-controlled interaction.

The method serves to create and execute complex information systems without resorting to programming, such systems being used, in particular, for administrative tasks (e.g. for order management, purchasing and customer service).

12 Claims, 5 Drawing Sheets

Objects:

Classes:

METHOD, SOFTWARE PRODUCT AND SYSTEM FOR CARRYING OUT UNIVERSAL, COMPUTER-AIDED INFORMATION PROCESSING

1. TECHNICAL FIELD OF THE INVENTION

The invention relates to a code-free method to automatically create structured information systems based on hierarchical, specifically object-oriented, modeling.

2. BACKGROUND ART AND LIMITATIONS OF KNOWN EMBODIMENTS

Today, creating complex information systems such as those used for administrative purposes (e.g. for order processing, purchasing, customer service), requires a development process. Such a process comprises a series of phases, beginning with describing a task, involving specification, modeling, programming in a high-level language, translating the code to machine language (or interpreting it) and execution by programmable hardware. The development phases from task description to programming are carried out manually (with computer-supported stages where applicable). These phases require a high level of human effort and they are error-prone.

Since about 1979, software tools in the form of spreadsheet programs are known, which enable users to represent information in tabular form and to generate derived information by interpreting expressions (formulae). Using these tools, solutions for a broad spectrum of applications can be created through suitable configuration (of table structure and expression specifications) without requiring expensive programming. However, spreadsheet programs do not provide adequate structuring capabilities for complex information systems (e.g. order processing, purchasing, customer service). Thus, spreadsheet programs are only used for applications of lower complexity.

3. PROBLEM AND SOLUTION ACCORDING TO THE INVENTION

The invention rests upon the problem of conceiving a more efficient and less error-prone method to create information systems. The method should be able to create information systems of a complexity range as large as possible, it should provide a high degree of automation and it should be easy to use.

The solution according to the invention consists of a method with the features of claim 1, a software product with the features of claim 14, and a system with the features of claim 12. The dependent claims relate to preferred embodiments of the invention.

The method is preferably comprised of steps to model a hierarchical data structure, steps to manipulate the contents of the hierarchy's elements, steps to generate the contents of the hierarchy's elements by evaluating expressions, and steps to represent the hierarchy and element contents.

In this description, the term 'hardware' designates means to execute said operations, in particular one or more computers comprised of a processor, memory, input devices and output devices. A software product is the materialization of software, in particular on storage media, said software being able to control hardware in a way, that said hardware can execute said operations. The term system refers to a combination of hardware and software capable of executing said operations.

The invention takes as its starting-point the insight that commercial information systems, as utilized, for example, for order processing, purchasing or customer service, can be reduced to the following basic features:

1. These systems represent structured information. From elementary structures (e.g. texts, numbers), higher-level structures (e.g. addresses, order line items) are assembled, said higher-level structures then becoming components of further structures of even higher levels (e.g. orders).
2. Some information is entered and edited by users or it is supplied or modified by external systems.
3. Other information is generated by the system, as it derives such information from other information, e.g. through addition, selection of subsets or special compilation (e.g. representation at a different place, in a different order).

Thus, in its preferred embodiment, the invention utilizes a hierarchical representation as its data structure and includes a method for the dynamic modeling of said data structure. Compared to fixed tables, this requires significantly greater effort in process engineering. Yet just the functionality resulting from this effort enables the user to create complex information systems through mere modeling, while until now such systems could only be developed through extensive manual programming.

Within this description, the meaning of the term 'modeling' includes, without limitation, the notion of actually affecting the composition of the hierarchical structure, e.g. by adding and removing elements, including whole sub-hierarchies, rather than, for example, being restricted to mere element hiding and exposing.

A preferred embodiment of the method involves an object-oriented form of modeling. In this description, any form of modeling is considered to be object-oriented, which represents the composition and properties of structures of the same kind separately from the actual instances (contents) of said structures. The common term for an instance is 'object'. A specification of objects of the same kind is a class. Alternative embodiments can differ in the extent of properties specifiable in a class. Such embodiments can provide for explicitly visible classes, which, for example, have names, as well as implicit classes. Alternative embodiments can provide for generalization/specialization relationships between classes, but they are not required to do so.

In a preferred embodiment, the modeling part of the method ensures that input means are available to adapt the hierarchical representation to any requirement, for example, by adding and removing elements within the hierarchy.

The part of the method responsible for the manipulation of contents uses input means to address elements of the modeled hierarchy and to assign or change contents (e.g. texts, numbers).

The evaluation part of this embodiment generates element contents by evaluating user-specified expressions and thus enables the required creation of derived information. The representation part provides access to the hierarchical structure and its contents by input and output means.

The said input and output means can be of any design. This provides for interactive/visual means such as, for example, a mouse-controlled graphical user interface, as well as machine-oriented means, for example, communications protocols facilitating communications with external systems.

The invention reduces the effort to create complex information systems, as it employs automation to eliminate the time-consuming traditional programming phase. In doing so, the invention increases the efficiency in the remaining phases of development as well, because after modeling, an immediately working implementation is available, which can be tested for practicability. As a result, this reduces the number and duration of phase iterations.

Once an information system created with this invention is operating productively, it can be adapted to changing requirements at any time with little effort through a simple model change. For this scenario, which frequently occurs in business practice, the invention enables short response times and thus a higher organizational agility.

Another advantage of using the invention is an increased abstraction level, as the model is directly executed. Persons sufficiently qualified in modeling can produce working information systems without having to program themselves. Furthermore, an information system thus created is highly self-documenting. Its higher abstraction level eliminates non-task-specific, technical details and makes it quick to understand for a wide range of users, including non-technical ones.

Aside from being used in a stand-alone fashion by interactive users, the invention can be used to integrate information from external systems, because the invention's structure can be adapted to the requirements of those external systems. Differences in semantics and incompatibilities between disparate external systems can be reconciled by using the evaluation means to convert information suitably. This integration functionality can be used as well to couple otherwise incompatible external systems in a purely automated way.

One embodiment enables not just multi-user and multi-system processing, but automatically scales to multiple processors and/or systems through distributed processing without calling for the complex programming traditionally required to achieve this.

4. DRAWINGS

5. MODES FOR CARRYING OUT THE INVENTION

Figure 1:
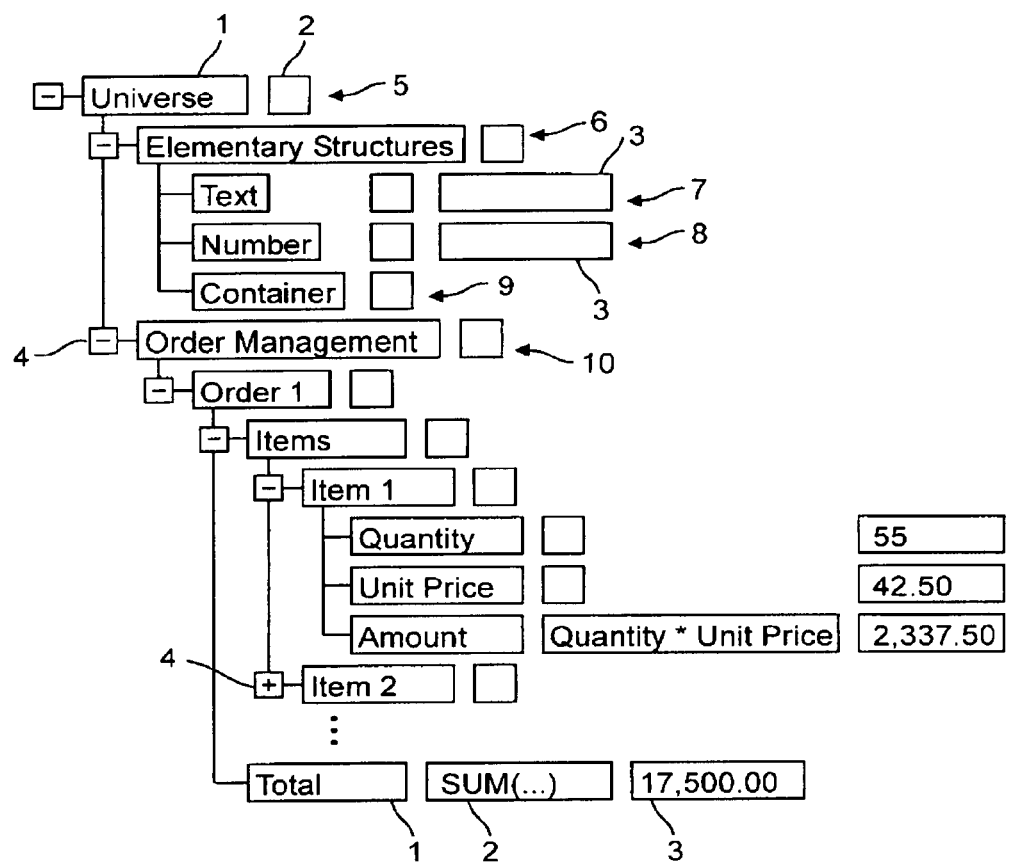
FIG. 1 depicts a modelable hierarchy in its simplest form.

FIG. 1 shows an exemplary hierarchy, as one embodiment can represent it by means of a graphical user interface. The hierarchy consists of elements, which comprise the attributes "Name" (1) and "Expression" (2). Both attributes are manipulatable via edit fields. Controls (4) serve to expand and collapse individual hierarchy levels.

Below the hierarchy's root named "Universe" appears a sub-structure "Elementary Structures" (6). This sub-structure contains a number of pre-built elements, whose type-specific behavior is pre-determined by the invention's method. These pre-built elements, in this case "Text" (7), "Number" (8) and "Container" (9), are supplied as part of the method.

The simple elements "Text" (7) and "Number" (8) hold a contents attribute (3), which is manipulatable via an edit field. If an expression (2) is specified, the method computes its result and stores it into the contents attribute (3). In this case, the attribute's edit field serves only for display purposes.

Alternative embodiments can provide further simple elements such as logic value, calendar date, time, time span, image. An element to hold the file contents of an arbitrary external application is conceived as well. The appropriate external application would be invoked to edit and represent said contents, which could occur in a visually integrated fashion as well as in a separate window.

The contents of the element "Container" (9) comprise a list of subordinate elements. The list can be empty, as is the case with "Container" (9), or it can contain any number of subordinate elements such as two in "Universe" (5) and three in "Elementary Structures" (6). To manipulate the element list, the method provides mouse-controlled interaction, specifically a drag&drop mechanism. To add a subordinate element, an element is selected at a different place and a copy of said element is dropped at the chosen insertion position, or said element is moved there, retaining its identity. To remove an element, it is selected, followed by choosing the remove command from a menu. If an expression is specified for a container element, the method computes its result in the form of a new list of subordinate elements and assigns said list to the container element. The list of subordinate elements cannot be changed interactively in this case.

Alternative embodiments can provide further aggregating elements, including, without limitation, list, set and multi-set (bag). These elements' subordinate elements would lack a name attribute, in contrast to those of a container.

The contents of an element can also consist of a reference to another element (the reference target). In this case the referencing element is treated as if it held a consistently up-to-date copy of the reference target's contents. A drag&drop mechanism serves to create a reference.

Using the disclosed procedures, the user can completely model the sub-structure below the element "Order Management" (10) depicted in FIG. 1. In this instance, the elements "Quantity", "Unit Price", "Amount", and "Total" are copies of the pre-built element "Number" (8). All the sub-structure's other elements are of the "Container" (9) type.

An interpreter serves to process expressions. For technologies to build interpreters, specifically when using parser generators, readers are generally referred to the book "Compilers: Principles, Techniques, and Tools" by Alfred V. Aho, Ravi Sethi, Jeffrey D. Ullman, Addison-Wesley, 1985. A newer, more powerful parser generator is described on the web site http://www.antlr.org.

To support the broadest possible range of applications, the expression evaluation mechanism provides for including the following components as part of expressions:

literals (texts, numbers, logic values), arithmetical operations (addition, multiplication, etc.), logical operations (comparisons, Boolean operations such as "AND", "OR", "NOT"), conditional expressions, which, depending on a condition 'a', return the result of a dependent expression 'b' or 'c' ("IF a THEN b ELSE c"), text operations (substring creation, determination of length, etc.), references (referencing an element by name, including the construction of paths, such as "Order A!Delivery Address!ZIP Code"), list references (referencing a list of elements via path construction involving wild cards, such as "Items!*!Amount"), aggregation operations, whose argument is a list reference (SUM( . . . ), COUNT( . . . ), MINIMUM( . . . ), etc.), an operation (CONTAINS-operator), which returns TRUE if an element is part of a list (List CONTAINS Element), Alternative embodiments can provide further expression components.

Most expressions return a single value, which is assigned to the contents of a simple element (Text, Number, etc.). In contrast, an expression, which uses the result of a list reference, returns a list of element references. Such expressions are accepted by aggregating elements only, whose list of subordinate elements said expressions create.

Figure 2:
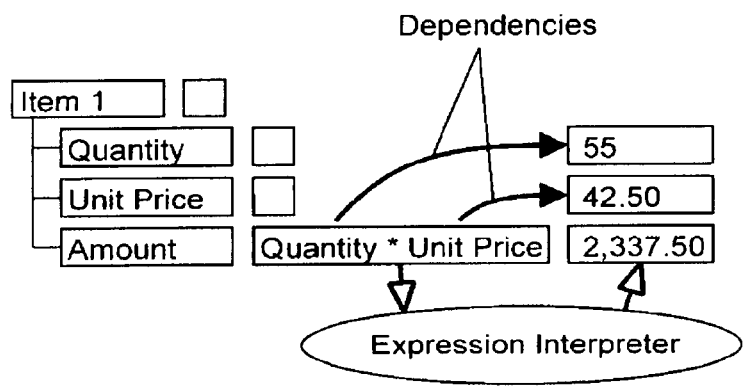
FIG. 2 illustrates a simple expression evaluation with dependencies to be registered.

If the contents of an element change or if an element is added or removed, it is potentially necessary to re-evaluate expressions. To avoid re-evaluating all expressions with each change, one embodiment involves an optimized method. With it, during the interpretation of an expression dependencies are analyzed and stored along with the result of said expression. Each element dependency is a tuple (DE, RE), with DE being a dependent element and RE being an element referenced by the expression associated with DE. It is assumed that for this purpose the elements are directly addressable (via a pointer construct). FIG. 2 shows a simple example.

In the case of a simple path reference, an element dependency (DE, $PE_i$) is registered for each path element $PE_i$. For the simple path reference "Order A!Delivery Address!Zip Code", three element dependencies would be registered, namely on "Order A", "Delivery Address" and "Zip Code".

Figure 3:
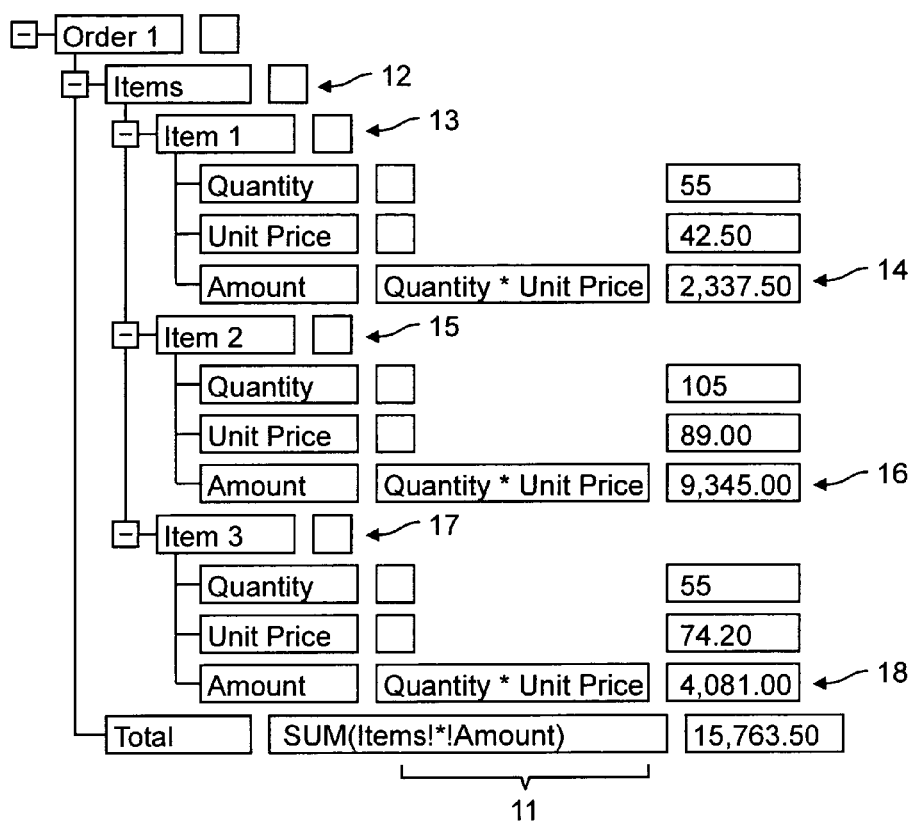
FIG. 3 illustrates an expression evaluation with a list reference to be evaluated.

In the case of a list reference, for each element $PE_i$ encountered on the way from the path's initial element to the respective list element found, an element dependency is to be registered. For the list reference "Items!*!Amount" (11) shown in FIG. 3, the wild card "*" would yield three elements ("Item 1", "Item 2", "Item 3"), so a total of 7 element dependencies would have to be registered, namely on "Items" (12), "Item 1" (13), "Item 1!Amount" (14), "Item 2" (15), "Item 2!Amount" (16), "Item 3" (17), "Item 3!Amount" (18).

An additional component dependency must be registered for the wild card "*", to consider the eventuality of a new element being inserted below the start element, from which the wild card search originates. A component dependency is a tuple (DE, SE) with DE being a dependent element and SE being the start element of the wild card in DE's expression.

Dependencies need only be registered for the part of an expression contributing to the currently computed result. Given an expression "IF a THEN b ELSE c", if the subexpression 'a' returns TRUE, dependencies must be registered for the sub-expressions 'a' and 'b', while there is no need to register dependencies for 'c'. Each evaluation determines the dependencies to be registered anew.

Whenever the contents of a referenced element RE change or become invalid, the contents of every element $DE_i$, which depends on RE and for which an element dependency (RE, $DE_i$) exists, are marked invalid. This procedure is repeated recursively for each dependent element.

If a new element is inserted, the contents of every element $DE_i$, which depends on a higher-level element HE and for which a component dependency (HE, $DE_i$) exists, are marked invalid. Further invalidation for these elements proceeds as described in the previous paragraph.

Instead of immediately re-computing contents, which have become invalid, it is sufficient to wait, until said contents are needed for representation or during the evaluation of an expression referencing them (lazy evaluation). To do so, a validity flag is stored along with the contents.

Figure 4:
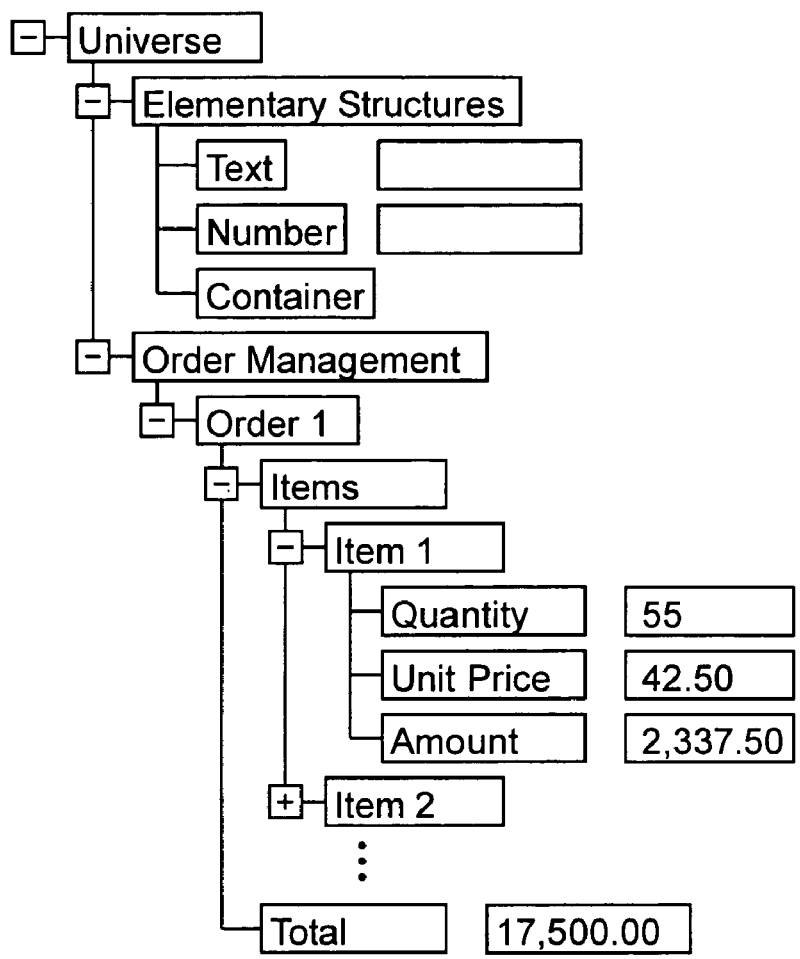
FIG. 4 shows a combination of an object hierarchy and a class hierarchy.
Figure 4:
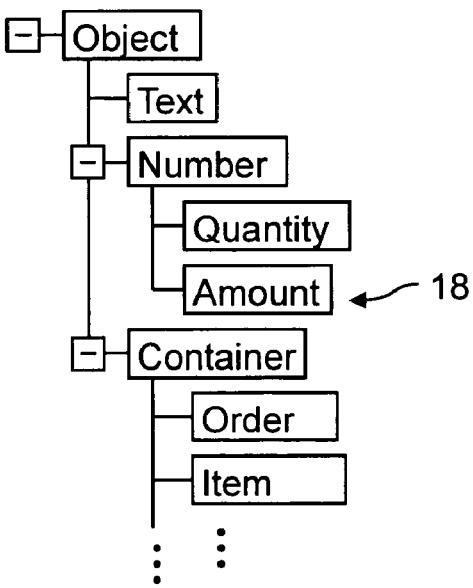

A further embodiment adds a variant involving object-oriented modeling to what has been disclosed thus far. To achieve this, the functions of the previous hierarchical structure are distributed to two hierarchies, namely an object and a class hierarchy. FIG. 4 shows a configuration of the object and class hierarchies, which is analogous to the previous embodiment. For clarity, in this configuration all container classes have been omitted, which serve no special purpose beyond aggregating elements (this applies to the containers of the elements "Universe", "Elementary Structures", "Order Management", "Items").

The object hierarchy corresponds to the previous hierarchy except for the fact that for each element the expression attribute no longer applies while a pointer to a class element is added.

Classes are arranged in their own hierarchy, which describes the generalization/specialization relationships between classes. Classes combine the properties of objects of the same kind and thus reduce the redundancy, which would otherwise arise in the object hierarchy. For example, if the object hierarchy contains 2000 objects of the class "Item" and the expression for the element "Amount" were to be changed, doing so with the previous embodiment would require changes in 2000 places. With a class hierarchy, a single change in the corresponding class element suffices.

Figure 5:
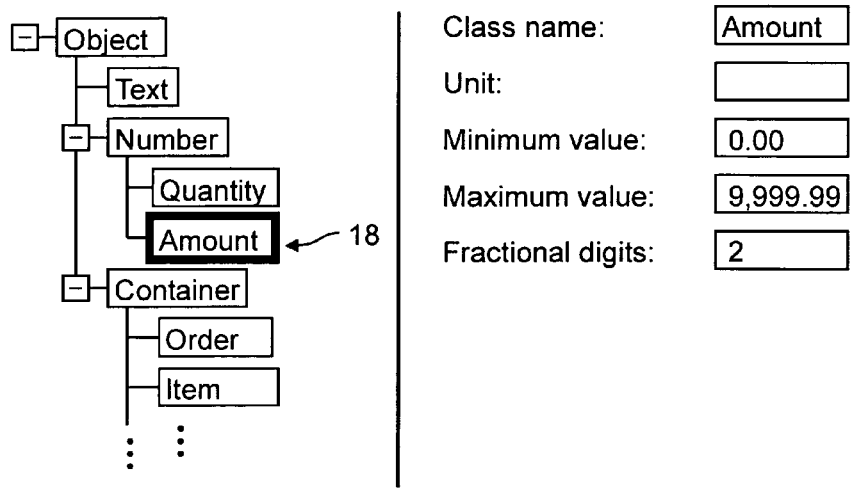
FIG. 5 shows the components of a number class.

Parts of attribute classes (classes of simple elements, such as, for example, "Text", "Number") are properties concerning representation (e.g., length, fractional digits) and, if applicable, integrity constraints (e.g., minimum value, maximum value). All properties can be manipulated via edit fields. The appropriate screen form appears next to the class hierarchy, whenever its corresponding attribute class is selected. FIG. 5 shows an example for the number class "Amount" (18) depicted in FIG. 4.

Aggregate classes (classes of aggregating elements, such as, for example, "Container", "List") contain class elements. A container class comprises an interactively (via drag&drop) manipulatable list of class elements, one per subordinate element of the corresponding container object. List and set classes each contain just one class element, because the subordinate elements of list and set objects are uniform.

Figure 6:
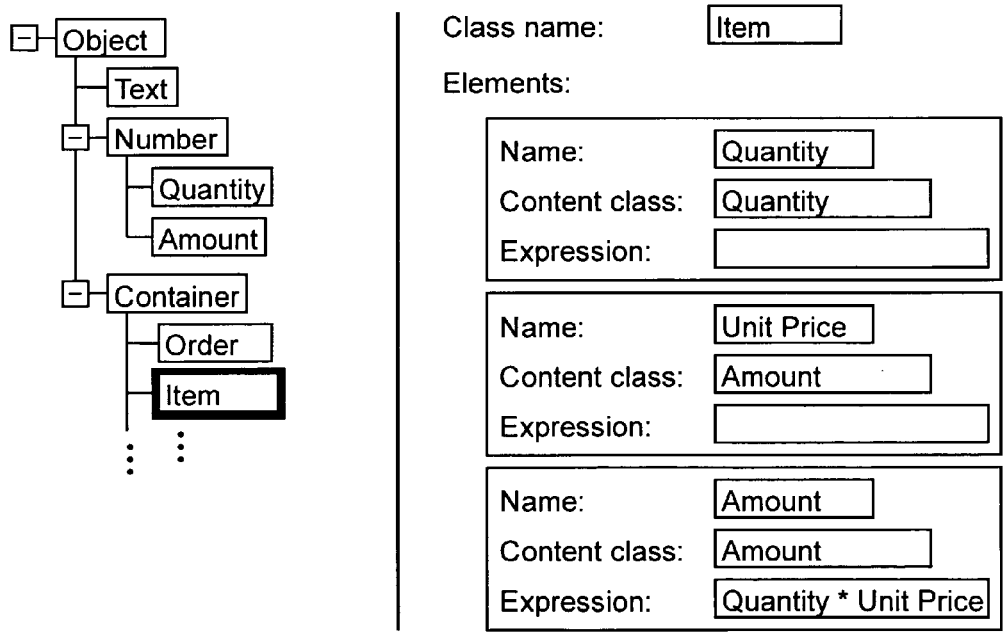
FIG. 6 shows the components of a container class.

A class element determines the behavior of an object element; in particular, it contains the corresponding expression and the object element's class of acceptable contents. In addition, class elements of container classes contain the name. The properties can be manipulated via edit fields. FIG. 6 illustrates an example of class elements of a container class.

A (class) specialization is bound by the properties of its generalization (class). For example, the specialization of a number class accepts minimum and maximum values only within the range of its generalization's properties. A specialized container class blocks the removal of an element, which stems from its generalization. A change of a generalization's properties automatically effects the adaptation of all its specializations. A class can have multiple generalizations (if so, said class appears at multiple places in the class hierarchy).

The class hierarchy is edited with interaction mechanisms analogous to those of the object hierarchy, particularly drag&drop. The rule applies: If a class A is placed below class B, class A becomes a specialization of B. A is adapted accordingly, in particular, a container class A would get in addition all of B's elements, which A and B did not have in common previously (due to a shared generalization). An additional editing mechanism is a menu-controlled option to create a specialization from a previously selected class.

If a class having multiple generalizations is removed at one place within the class hierarchy, just that particular generalization/specialization relationship is removed. The class itself will be removed if, and only if, no further generalizations exist.

A changed of a class' properties effects the adaptation of all objects of said class. For example, the removal of an element of a container class effects the removal of all corresponding object elements.

An additional embodiment can provide for certain structure changes to work on the object level as well, in particular the addition and removal of a container object's elements. By this means, for example, an order item can be added to an order or removed from it. Such a manipulation function is implemented by having an object-level manipulation of a container object C implicitly create a specialization of the container class corresponding to C on the class level, and then making that specialization the new class of the modified container object C. This prevents the change from unintentionally affecting other objects of the original class. The creation of a class specialization does not need to be repeated, as long as the object is the only one of its class.

The class-based embodiment involves additional expression evaluation modes. The evaluation of the functional expression "COMPONENTS(Class)" returns all subordinate elements, whose content class corresponds to the class specified (including its specializations). Thus, "COMPONENTS (item)" would, starting at the current object, return the set of all subordinate objects of the class "Item" (or a specialization of it). A variant of this function supplementarily contains a conditional expression: "COMPONENTS(Class IF Condition)". The conditional expression is evaluated relative to each considered object matching the search class. Compared to the initial variant, this function limits the elements returned to those fulfilling the condition. For example, "COMPONENTS(item IF Amount>5000)" would return all Items, whose amount exceeds 5000.

The expression evaluation can be implemented in a way that capitalizes on the concept of polymorphism, known in object-oriented methodology. With it, every object element would be able to accept not just contents of the class C specified for the element, but also contents in the form of a specialization $SC_i$. For expression evaluation purposes, contents of class $SC_i$ would be transformed to class C on each occasion.

A further embodiment introduces additional mode parameters for each element, said parameters controlling various representation and editing modes of an element. A per-element set of mode parameters comprises the following parameters, which are manipulatable by input means (drop-down menus in particular):

An access parameter, featuring the alternatives "no appearance", "read-only", "read and write", controls whether an element appears at all and whether the user may modify it.

A shape parameter, featuring the alternatives "individual" or "uniform", controls whether the contents appear in the shape of their specific class (a specialization of the class specified in the class element) or whether the contents are transformed for representation into the class specified in the class element (polymorphism, applicable only with the class-based embodiment).

An arrangement parameter, featuring the alternatives "hierarchical", "tabular", "one-line", controls the arrangement of subordinate elements, so that besides a hierarchical arrangement, an (automatically generated) table or the sequential arrangement within one line is possible (the latter being practical, for example, for "Quantity", followed by "Quantity Unit").

A reference target parameter, featuring the alternatives "integrated" and "in a separate window area", controls whether the target of a reference appears like original self-owned contents (integrated) or whether there appears just a button, which can be clicked and then shows the referenced content in a separate window area.

Further embodiments can feature additional mode parameters. Some mode parameters (such as the reference target parameter) apply to user interaction exclusively. Other parameters equally affect the machine-controlled use of the system. For example, the access parameter "no appearance" produces the effect, that the corresponding element is inaccessible via a communications protocol. Analogously, an access parameter "read-only" causes a content change initiated over a communications protocol to be rejected.

A further embodiment comprises a list per object element or per class element, the elements of said list comprising a condition expression and a set of mode parameters. To determine an element's effectual set of mode parameters, the condition expressions are evaluated in list order. Each condition expression must return a logic value. If it returns TRUE, the corresponding set of mode parameters is effectual. Otherwise, the determination proceeds with the next list element. A missing expression is treated as if it were always true.

With this variant, it is possible to activate representation and editing modes depending on the contents of the corresponding element, and depending on contents anywhere in the object hierarchy as well. Because information about the system's users and an authorization concept can always be deposited in said hierarchy, these means facilitate the modeling and configuration of a complex access authorization system. To retrieve the current session's user at run time, a function "USER( )" is added to the expression evaluation mechanism. If a role-based scheme is desired, an expression like !Org!COMPONENT(User IF Name=USER( ))!Roles
CONTAINS
!Org!Roles!Controller determines, whether the current user possesses the required authorization of a controller. Aside from various access authorizations, a user can set up role-specific representations as well.

With the class-based embodiment, the parameters for representation and editing modes are advantageously co-located with the class elements.

As a rule, the information provided by the invention's method resides on storage media. For this purpose, object-oriented or relational database systems are utilized. In multi-user operations, usual locking mechanisms (read and write locks) are employed on the class and object levels, said mechanisms precluding update conflicts due to parallel editing by different users.

Figure 7:
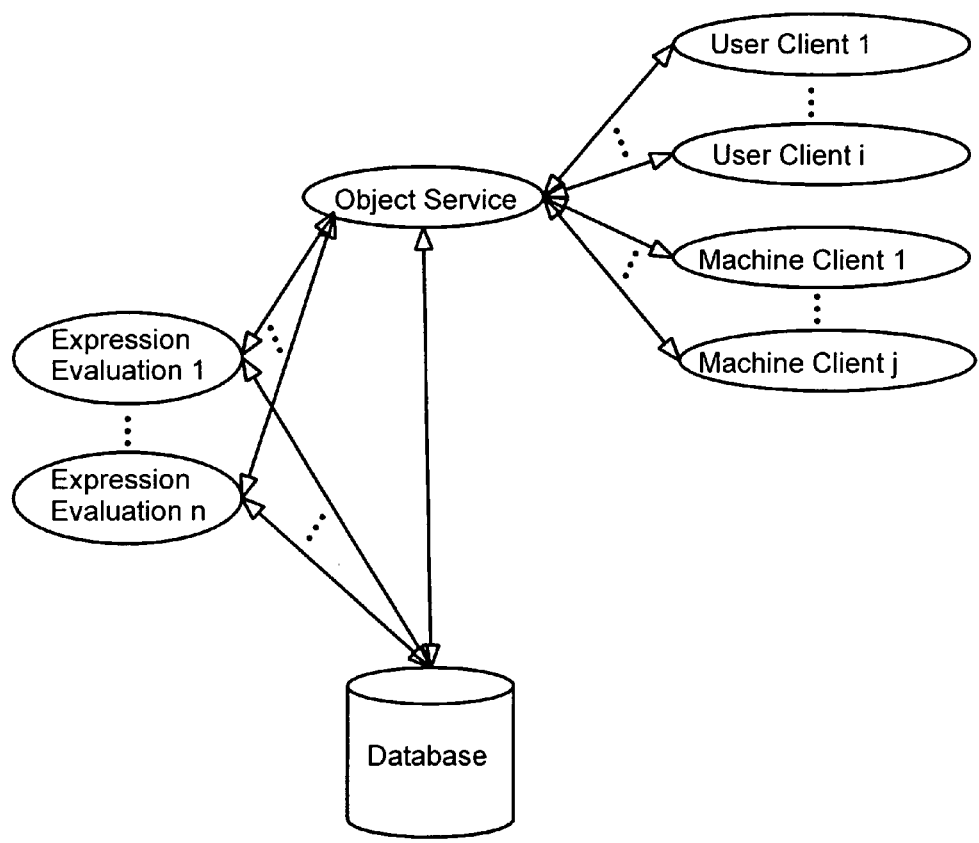
FIG. 7 shows an embodiment with distributed processing.

A further embodiment involves parallel processing by distributing it across multiple processors or hardware systems, being able to interact with users as well as machines at the same time, as shown in FIG. 7. There, a central (object) service communicates with user clients and/or machine clients, which can run on the same hardware or other networked hardware. Communication takes place over arbitrary transport protocols (e.g. TCP, HTTP) at the lower levels and at the highest level over a suitable content protocol (e.g., based on XML, which is capable of directly representing object and class hierarchies). The content protocol is used bidirectionally, both for client requests and for the object service's responses. It maps all operations, which are feasible interactively, including the retrieval and manipulation of meta information (classes). The required data structures can be derived straight from the visualizations described so far. To specify a hierarchy position, for example, when inserting a class, path composition is used, as it is described with the expression evaluation mechanism above. In addition, all objects, classes and class elements can be furnished with a unique identification (for example, an automatically generated serial number). With it, a short form of direct addressing is available. For a possible protocol implementation, readers are referred to the XML specifications (http://www.w3.org/XML/) and the standardization proposal SOAP (http://www.w3.org/TR/SOAP/).

If a client requests contents, which first of all have to be determined through expression evaluation, the object service will, at the client's choice, either carry out the evaluation immediately and have the client wait, if necessary, or the object service will inform the client later about occurring changes via asynchronous notifications. The object service will also inform a client about changes, which other clients have effected on jointly used objects. To do so, the object service uses a directory containing all objects currently in use by any client.

As a central coordination authority, the object service may delegate the evaluation of expressions to separate evaluation processes. Requests for contents, which involve expression evaluation, initially originate with clients. Such requests can be collected in a queue and dispatched to the next free evaluation process in turn. This process is then regarded as busy, until it sends a ready signal to the object service. During the expression evaluation it is bound to occur, that one evaluation process must wait for contents, which are being determined by another evaluation process. To achieve the necessary synchronization, the object service keeps a directory of contents, which are just being determined, and the corresponding evaluation process. A deadlock detection mechanism must detect cycles, where two evaluation processes wait on each other, directly or indirectly. If this is the case, the evaluation is withdrawn from one process and assigned to the other. As a central authority, the object service further coordinates access conflicts between evaluation processes and between evaluation processes and clients.

Further embodiments can apply suitable partitioning methods in order to partition the set of expressions to be evaluated, before assigning them to evaluation processes, in a way that minimizes the number of mutual dependencies between expressions evaluated by different processes.

A further embodiment extends the expression evaluation mechanism with an interface to call external functions, which can be linked in via a dynamic library (DLL, shared library). There it can be generally assumed that an external function can accept any number of parameters (including a variable number of parameters) and return a result value. In an invocation of the external function, it must request the necessary parameters via a programming interface. When a parameter is used, the expression evaluation will evaluate said parameter as a partial expression and register the necessary dependencies. Checking for the correct number of parameters and parameter types would be the responsibility of the external function, which can signal error states via appropriate protocol functions.

A further embodiment extends the communications protocol between object service and clients with a function, which a client uses to specify an object element and events of interest (contents change, invalidation). When a corresponding event occurs, the client receives a notification. The client can then, as the need arises, retrieve contents via the mechanisms described above (and initiate the necessary expression evaluations where applicable) and, for example, transmit such contents to external systems.

These definitions guide the accompanying claims:
The term "comprising" means consisting at least of.
The term "plurality" means two or more.

The term "data element" refers to an element which generally comprises a contents member; however, it is intended to cover cases where such contents member is logically, but not physically present.

While the term "simple contents" typically includes contents of types number, text, logic value, calendar date, time, time span, image or file reference, the term is intended to cover any kind of non-aggregate contents according to this method.

The term "store" means retaining data in all kinds of data storage means, including temporary storage means, like RAM, and persistent storage means, like hard disks.

What is claimed is:

1. Method for machine-executable information processing, comprising:
   means to store a hierarchy of data elements, said hierarchy comprising:
   a plurality of data element each comprising a contents member being able to hold simple contents, said simple contents not comprising further said data elements,
   a plurality of data elements each comprising a contents member being able to hold aggregate contents, said aggregate contents comprising a subordinate hierarchy level, said subordinate hierarchy level comprising a plurality of data elements,
   a plurality of data elements each being able to have an associated fuctional expression optionally selectable by input means,
   a plurality of said functional expressions each being able to contain a reference using dynamic binding to refer to the contents of at least one data element different from the data element associated with said functional expression;
   steps to model said hierarchy of data elements by input means, comprising steps to insert a new hierarchy level and steps to insert a data element into an existing hierarchy level;
   steps to manipulate said simple contents by input means;
   steps to associate a functional expression with a data element by input means and steps to manipulate said functional expression by input means;
   steps to output a plurality of said data elements by output means;
   steps to update the contents of a plurality of said data elements associated with said functional expressions by machine-evaluating each said functional expression and updating the contents of its associated said data element to reflect the result of said functional expression.

2. Method according to claim 1, wherein said hierarchy of data elements is an object hierarchy and the method further comprises means to store, model and output a hierarchy of classes, each class being associated with a plurality of said data elements and said class comprising a specification of the common configuration and properties of a plurality of said data elements separately from said data element'individual contents.

3. Method according to claim 1, further comprising steps to select different output and editing modes for data elements depending on parameters, and steps to manipulate said parameters by input means.

4. Method according to claim 3, wherein multiple sets of parameters may exist per element with one of said parameters sets becoming effectual depending on the results of manipulatable expressions.

5. Method according to claim 1, wherein all information, including meta information, is stored persistently, particularly in an object-oriented or relational database.

6. Method according to claims 1, wherein the expression evaluation is carried out in an optimized way by
   a) marking the result of an expression invalid if, and only if the expression was modified or the contents of an element referenced by the expression were modified or became invalid and
   b) updating the result on an expression not until it is needed for output or in the course of computing another result.

7. Method according to claim 1, wherein the system architecture allows for a distribution of functions, which enables separate processing for
   a) visualization and editing of information and meta information,
   b) serving information and meta information, in particular for purposes of visualization and editing or for input and output directed at external systems,
   c) parallel evaluation of expressions by means of any number of processors.

8. Method according to claim 1, wherein the expression evaluation can be extended with external (user-defined) functions.

9. Method according to claim 1, wherein upon request an external process is notified about changes or invalidations of selectable structure components.

10. System, which is configured to be capable of executing a method according to claim 1.

11. Method according to claim 1, wherein the machine-evaluable expression can return contents in the form of an aggregate structure.

12. Software product containing components, which execute in conjunction with hardware a method according to any one of claims, 2 to 9. or 11.

* * * * *